United States Patent
Ohara et al.

(10) Patent No.: US 10,501,334 B2
(45) Date of Patent: Dec. 10, 2019

(54) AQUEOUS COBALT CHLORIDE SOLUTION REFINEMENT METHOD

(71) Applicant: SUMITOMO METAL MINING CO., LTD., Tokyo (JP)

(72) Inventors: Hideki Ohara, Niihama (JP); Satoshi Asano, Niihama (JP); Toshirou Tan, Niihama (JP); Masatoshi Takano, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 63 days.

(21) Appl. No.: 15/577,521

(22) PCT Filed: May 20, 2016

(86) PCT No.: PCT/JP2016/065046
§ 371 (c)(1),
(2) Date: Nov. 28, 2017

(87) PCT Pub. No.: WO2016/194659
PCT Pub. Date: Dec. 8, 2016

(65) Prior Publication Data
US 2018/0134577 A1 May 17, 2018

(30) Foreign Application Priority Data
May 29, 2015 (JP) .................. 2015-110667

(51) Int. Cl.
*C01G 51/08* (2006.01)
*C22B 23/06* (2006.01)
(Continued)

(52) U.S. Cl.
CPC ............ *C01G 51/08* (2013.01); *C22B 3/46* (2013.01); *C22B 23/0469* (2013.01);
(Continued)

(58) Field of Classification Search
CPC ..... C01G 51/08; C22B 23/0469; C22B 23/06; C22B 3/46
See application file for complete search history.

(56) References Cited

U.S. PATENT DOCUMENTS 3,473,920 A * 10/1969 Oberg .................. C01G 51/08
75/738
3,903,236 A * 9/1975 McCutcheon ............ C22B 1/08
423/139
3,950,486 A * 4/1976 Cardwell ............... C01G 3/003
423/24

* cited by examiner

*Primary Examiner* — Ngoc-Yen Nguyen
(74) *Attorney, Agent, or Firm* — Kratz, Quintos & Hanson, LLP

(57) ABSTRACT

An aqueous cobalt chloride solution refinement method, in which metallic nickel is washed with an acidic liquid having a pH of not more than 2.5 before the metallic nickel is brought into contact with the aqueous solution containing cobalt chloride. Since the metallic nickel is washed with the acidic liquid having a pH of not more than 2.5, a passive film on a surface of the metallic nickel is removed and therefore, when the metallic nickel comes in contact with the aqueous solution containing cobalt chloride, an impurity more noble than the metallic nickel can be precipitated by a cementation reaction. In addition, since the metallic nickel is only washed with acid to be brought into contact with the aqueous solution containing cobalt chloride, impurities can be easily removed from the aqueous solution containing cobalt chloride.

6 Claims, 2 Drawing Sheets

(51) Int. Cl.
 *C22B 3/46* (2006.01)
 *H01M 4/525* (2010.01)
 *C22B 3/00* (2006.01)
(52) U.S. Cl.
 CPC ............ *C22B 23/06* (2013.01); *H01M 4/525* (2013.01); *Y02P 10/234* (2015.11)

[Fig.1]
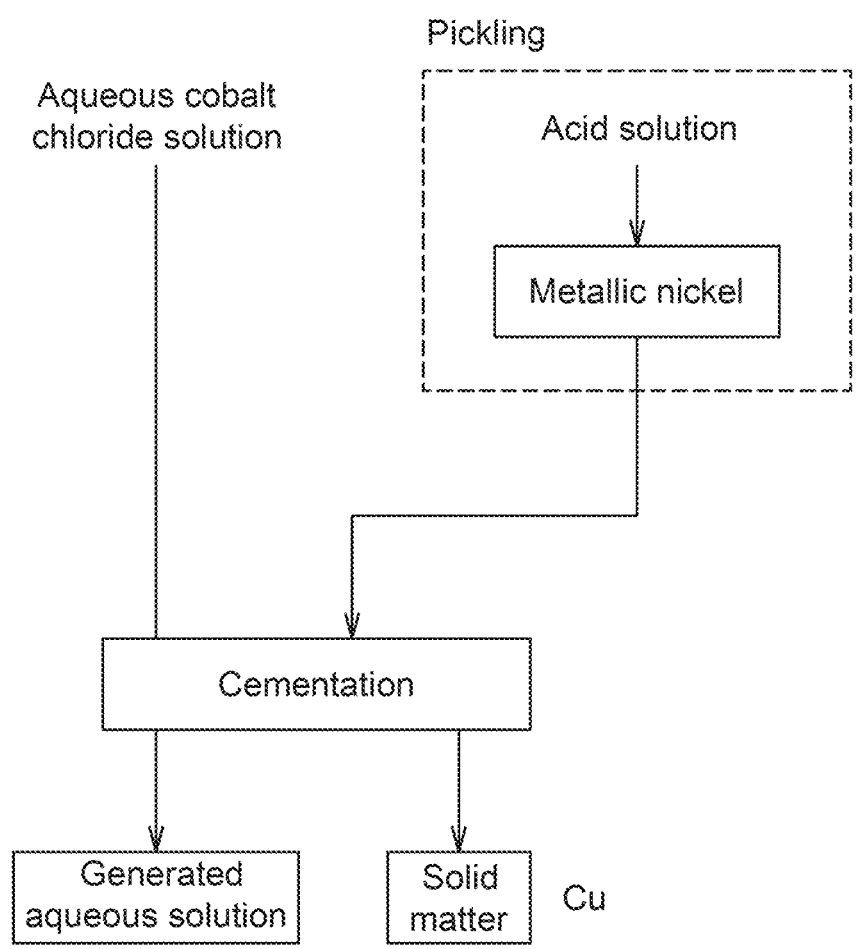

[Fig.2]
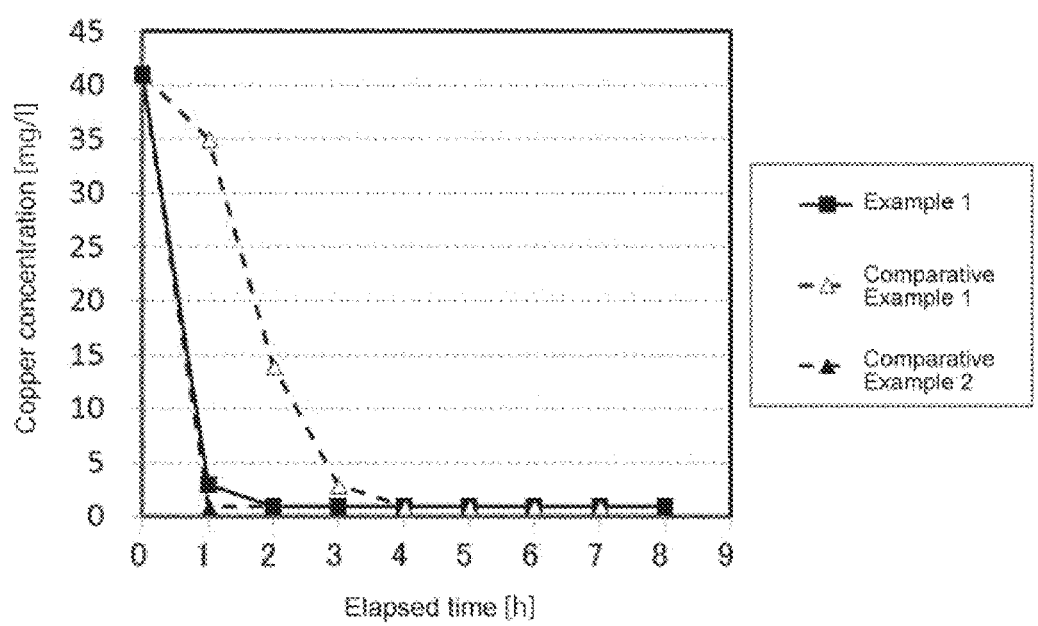

AQUEOUS COBALT CHLORIDE SOLUTION REFINEMENT METHOD

TECHNICAL FIELD

The present invention relates to an aqueous cobalt chloride solution refinement method.

BACKGROUND ART

Cobalt is a rare metal and is a valuable metal used as a material of an alloy. Cobalt is also used as an electrode material for batteries other than alloys. For example, cobalt is also used for a positive electrode material of a lithium ion battery, which is a nonaqueous electrolyte secondary battery for in-vehicle use that has been developed recently.

When producing a positive electrode material of the lithium ion battery which is the nonaqueous electrolyte secondary battery, a metal hydroxide called a precursor prepared by neutralizing an aqueous solution of a metal salt mixed at a predetermined ratio is generally formed. When the precursor and a lithium compound are mixed and fired, a positive electrode material is produced. In production of a positive electrode material containing cobalt, a salt containing cobalt (for example, a cobalt salt such as cobalt sulfate or cobalt chloride) is used when the above-described aqueous solution of a metal salt is produced.

The above-described cobalt salt can be obtained as a by-product in a process of smelting nickel ore and the like. Specifically, wet processing is employed for refinement of impurities, and a cobalt salt is generated from a cobalt salt solution produced at the processing. However, in addition to nickel and cobalt, nickel ore and the like contain various kinds of impurities such as manganese, iron, copper and chromium. If the cobalt salt solution also contains impurities, the impurities may be mixed into the cobalt salt. If the cobalt salt containing impurities is used for producing the positive electrode material, impurities may be mixed into the positive electrode material.

The presence of impurities in the positive electrode material greatly affects the performance of the positive electrode material, that is, battery characteristics. In particular, since the lithium ion battery as described above has a high capacity and a high voltage, the presence of a trace amount of impurities greatly affects the battery characteristics, and therefore, specifications of impurities of raw materials such as a cobalt salt are controlled extremely strictly. In particular, since copper is an important impurity which greatly affects the performance of the battery, it is required to strictly control the amount of copper contained in raw materials such as a cobalt salt.

As a method for reducing impurities such as copper contained in the cobalt salt, methods such as a solvent extraction method and an electrolytic method have been known. In other words, when copper is removed from the cobalt salt solution by the solvent extraction method or the electrolytic method, the copper concentration in the cobalt salt solution, that is, the amount of copper contained in the cobalt salt can be reduced. However, these methods cannot significantly lower the lower limit concentration of separable copper. In addition, these methods require a large scale apparatus such as a solvent extraction apparatus such as a mixer settler, an electrolytic cell, and a power source, so that there is a problem that the cost of equipment investment increases and the processing cost increases.

As a simpler method than the solvent extraction method and the electrolytic method, there is a precipitation method. In the precipitation method, a neutralizing agent, a sulfurizing agent and the like are added to generate a precipitate and to separate impurities, and this method has been widely used for wastewater treatment for heavy metals such as copper and the like.

In a sulfurization method of precipitating and removing copper as a sulfide using a sulfurizing agent, the solubility of copper sulfide is very small (water solubility: 18° C., $3.4 \times 10^{-4}$ g/L), and there is an advantage that the concentration of copper in a solution can be greatly reduced. However, since a harmful hydrogen sulfide gas is used as a sulfurizing agent, securement of the safety of workers and environmental measures are required. Although various efforts have been made to control hydrogen sulfide (for example, Patent Document 1), the device configuration is complicated, so that there is a problem that the cost for an incidental facilities increases.

It is also conceivable to employ a neutralization precipitation method in which an alkali such as sodium hydroxide is added to form hydroxide precipitates of heavy metals and remove them. In the case of removing copper by the neutralization precipitation method, the pH of a solution is usually adjusted within the range of pH 8 to 12 from the viewpoint of solubility (for example, Non-Patent Document 1). However, since cobalt also precipitates in the same pH range, cobalt precipitates together with copper when the neutralization precipitation method is used for a cobalt salt solution, and cobalt is lost. In order to reduce the loss of cobalt, it is conceivable to remove copper in a pH range lower than the above range. Although it is possible to precipitate copper hydroxide at a pH less than pH 8, the solubility increases. Thus, the concentration of copper in the cobalt salt solution cannot be significantly reduced. Specifically, in order to prevent the loss of cobalt, it is necessary to set the solubility of cobalt to not less than 100 g-Co/L, and since the solubility product of cobalt is $2.2 \times 10^{-16}$, the pH must be pH 6 or less. On the other hand, the solubility product of copper is $2.2 \times 10^{-20}$, and since the solubility of copper is 14 mg-Cu/L at pH 6, the separation property of copper is deteriorated.

In addition, it is conceivable to remove copper by a cementation method (substitution method). In the cementation method, metal ions to be removed are reduced by an electrically base metal and removed. Accordingly, copper can be removed from a solution by using a metal less noble than copper. For example, cobalt is a metal less noble than copper, so that when cobalt metal is used, copper in a cobalt chloride solution can be precipitated and removed.

In the cementation method, since the base metal used is ionized and dissolved in the solution, it is necessary to use a metal which does not cause problems even when dissolved. However, since the above-described cobalt metal is a material of a positive electrode material, even if the cobalt metal remains in a cobalt salt solution, it does not affect electrode performance.

PRIOR ART DOCUMENTS

Patent Documents

Patent Document 1: WO 2003/20647
Non-Patent Document 1: "Lectures on Water Treatment Technology" written by Fumitaka Yoshimura, published by Gijutsu-Hyohron Co., Ltd., issued in 2011

SUMMARY OF THE INVENTION

Problems to be Solved by the Invention

However, cobalt metal is usually distributed as a cobalt plate, and it is difficult to obtain cobalt metal in a highly reactive powder or briquette shape. In other words, in the case of separating copper from a cobalt salt solution by cementation with use of cobalt metal, copper can only be separated by using a low reactive cobalt plate, so that the efficiency of removing copper is deteriorated.

In order to improve the reactivity, a method of raising the liquid temperature of the cobalt salt solution is considered. In other words, when cementation is performed with a cobalt plate in a state where the cobalt salt solution is warmed, there is a possibility that the reactivity between the cobalt plate and copper can be increased. However, in order to warm the cobalt salt solution, energy for the warming and equipment for the warming are necessary, and this leads to cost increase.

Moreover, since the cementation reaction is an exothermic reaction, the liquid temperature of the cobalt salt solution rises along with the reaction. When the cobalt salt solution is operated in a warmed state, there is a possibility that the liquid temperature rises excessively by heat generation due to the reaction. Then, the cementation reaction is further accelerated, so that countermeasures against hydrogen gas generated during the reaction are required, and precipitated copper tends to become a fine powder. Even when copper which has become a fine powder is precipitated, the copper tends to be redissolved in the cobalt salt solution, and there is a possibility that the copper concentration in the cobalt salt solution cannot be sufficiently lowered. Particularly in the case of a cobalt chloride solution, the tendency of a copper fine powder to be redissolved is remarkable, and copper precipitated in a fine powder state tends to be oxidized, so that there is a problem such as easiness of heat generation after recovery.

Accordingly, in the present situation, when copper is removed from a cobalt salt solution, the operation efficiency is lowered in order to stably reduce the copper concentration without increasing the cost of equipment investment; however, removal of copper by the cementation reaction using a low reactive cobalt plate has been carried out.

In view of the above circumstances, it is an object of the present invention to provide an aqueous cobalt chloride solution refinement method that can remove impurities efficiently from a cobalt salt solution.

Means for Solving the Problems

According to a first aspect, an aqueous cobalt chloride solution refinement is a method for bringing metallic nickel into contact with an aqueous solution containing cobalt chloride to remove an impurity by a cementation reaction, in which the aqueous solution containing cobalt chloride has a pH of not less than 1.5 and not more than 2.5, and the metallic nickel is washed with an acidic liquid having a pH of not more than 2.5 before the metallic nickel is brought into contact with the aqueous solution containing cobalt chloride.

According to a second aspect, in the aqueous cobalt chloride solution refinement method of the first aspect, the aqueous solution containing cobalt chloride at room temperature is brought into contact with the metallic nickel.

According to a third aspect, in the aqueous cobalt chloride solution refinement method of the first or second aspect, the impurity is copper.

According to a fourth aspect, in the aqueous cobalt chloride solution refinement method of any one of the first to third aspects, the aqueous solution containing cobalt chloride from which the impurity has been removed is a solution used as a raw material of a positive electrode material containing in the composition of the positive electrode material nickel and cobalt in a nonaqueous electrolyte secondary battery.

According to a fifth aspect, in the aqueous cobalt chloride solution refinement method of the fourth aspect, the aqueous solution containing cobalt chloride is a process liquid in a nickel smelting process, and the aqueous solution containing cobalt chloride from which the impurity has been removed is used in a liquid state as a raw material of the positive electrode material.

According to a sixth aspect, in the aqueous cobalt chloride solution refinement method of the first, second, third, fourth, or fifth aspect, the aqueous solution containing cobalt chloride at a liquid temperature of 10 to 40° C. is brought into contact with the metallic nickel.

Effect of the Invention

According to the first aspect, since the metallic nickel is washed with the acidic liquid having a pH of not more than 2.5, a passive film on a surface of the metallic nickel is removed. The passive film is removed from the metallic nickel, and therefore, when the metallic nickel comes in contact with the aqueous solution containing cobalt chloride, an impurity more noble than the metallic nickel can be precipitated by the cementation reaction. In addition, since the metallic nickel is only washed with acid to be brought into contact with the aqueous solution containing cobalt chloride, the impurity can be easily removed from the aqueous solution containing cobalt chloride.

According to the second aspect, since the aqueous cobalt chloride solution is brought into contact with the metallic nickel at room temperature, it is not necessary to warm the aqueous cobalt chloride solution. Accordingly, since equipment for warming is unnecessary, there is no need to increase the cost of equipment investment. In addition, even when the cementation reaction occurs, the liquid temperature of the aqueous cobalt chloride solution does not rise excessively, so that stable operation can be performed.

According to the third aspect, since copper is removed to a low concentration, the concentration of copper contained in a cobalt salt produced from the aqueous cobalt chloride solution can be lowered. Accordingly, the refined aqueous cobalt chloride solution can be used for producing a cobalt salt suitable for a raw material for producing a material adversely affected by the presence of copper, like a material of a nonaqueous electrolyte secondary battery.

According to the fourth aspect, the concentration of the impurity in the aqueous cobalt chloride solution can be drastically lowered while the aqueous cobalt chloride solution can be an aqueous solution containing nickel. Accordingly, the refined aqueous cobalt chloride solution can be used as a raw material of a positive electrode material containing in the composition of the positive electrode material nickel and cobalt in a nonaqueous electrolyte secondary battery.

According to the fifth aspect, when an impurity such as copper is treated, the refined aqueous cobalt chloride solution can be used as it is as a raw material of a positive electrode material containing in the composition of the positive electrode material nickel and cobalt in a nonaqueous electrolyte secondary battery. Accordingly, it is not necessary to produce a cobalt salt from the process liquid in the nickel smelting process, so that it is possible to obtain an advantage that the production of the positive electrode material of the nonaqueous electrolyte secondary battery can be efficiently made.

According to the sixth aspect, even when the cementation reaction occurs, the liquid temperature of the aqueous cobalt chloride solution does not rise excessively, so that stable operation can be performed.

BRIEF DESCRIPTION OF THE DRAWINGS

FIG. 1 is a schematic flow diagram of an aqueous cobalt chloride solution refinement method according to the present invention.

FIG. 2 is a graph showing results of examples.

MODE FOR CARRYING OUT THE INVENTION

An aqueous cobalt chloride solution refinement method according to the present invention is a method for removing an impurity contained in an aqueous solution containing cobalt chloride and is characterized by being capable of stably reducing the impurity concentration without increasing the cost of equipment investment.

An aqueous solution (target aqueous solution) from which an impurity is removed by the aqueous cobalt chloride solution refinement method according to the present invention may be an aqueous solution containing cobalt chloride (hereinafter simply referred to as an aqueous cobalt chloride solution). For example, it is possible to use as the target aqueous solution an aqueous solution (intermediate process liquid in nickel smelting) generated when impurities are refined by wet processing in a process of smelting nickel ore and the like or an aqueous solution generated when wet processing is performed to recover cobalt from secondary raw materials such as used batteries, sludge generated from wastewater treatment in the nickel smelting process, and the like.

The use of an aqueous solution (generated aqueous solution) generated by the aqueous cobalt chloride solution refinement method according to the present invention is not also particularly limited. For example, the generated aqueous solution can be used as a raw material for producing electrolytic cobalt or cobalt salt, and can also be used as a raw material of a positive electrode material containing in the composition thereof cobalt in a nonaqueous electrolyte secondary battery. As will be described later, since the generated aqueous solution is an aqueous solution containing nickel, the generated aqueous solution can be used as a raw material of a positive electrode material containing in the composition thereof nickel and cobalt in a nonaqueous electrolyte secondary battery. For example, the generated aqueous solution can be used as a raw material of a positive electrode material of a ternary (NCM) or nickel-based (NCA) lithium ion battery.

In particular, when an intermediate process liquid in nickel smelting is employed as a target aqueous solution, and the generated aqueous solution is used as a raw material of a positive electrode material containing in the composition thereof cobalt (or nickel and cobalt) in a nonaqueous electrolyte secondary battery, it is possible to obtain an advantage that production of the positive electrode material of the nonaqueous electrolyte secondary battery can be efficiently made.

That is, the positive electrode material of the nonaqueous electrolyte secondary battery is produced by firing a precursor of a metal hydroxide called a precursor prepared by neutralizing an aqueous solution of a metal salt mixed at a predetermined ratio. In this case, the aqueous solution of the metal salt is prepared by dissolving a solid matter (such as nickel salt or cobalt salt). On the other hand, the solid matter is produced from an intermediate process liquid in nickel smelting, which contains nickel salt, cobalt salt, or the like. Thus, nickel salt, cobalt salt, or the like which is in an aqueous solution state is temporarily solidified and then dissolved again to prepare an aqueous solution (raw material aqueous solution) of nickel salt or cobalt salt. Although it is considered that impurities in the raw material aqueous solution are reduced relative to the intermediate process liquid in nickel smelting, it can be considered that this takes extra labor and cost to form and dissolve the solid matter.

However, when the intermediate process liquid in nickel smelting is used as a target aqueous solution and an aqueous solution from which impurities have been removed by the aqueous cobalt chloride solution refinement method according to the present invention is formed, the generated aqueous solution can be used as it is as a raw material of a positive electrode material. Thus, the process of forming and dissolving the solid matter can be omitted, so that the production of the positive electrode material of the nonaqueous electrolyte secondary battery can be efficiently made.

In the aqueous cobalt chloride solution refinement method according to the present invention, metals more noble than nickel and cobalt can be removed as impurities. For example, copper, silver or the like can be removed as an impurity from an aqueous solution. In particular, when the aqueous cobalt chloride solution refinement method according to the present invention is employed in order to remove copper from the aqueous cobalt chloride solution, copper can be removed to have a low concentration (for example, approximately 0.5 to 1.0 mg/L). Thus, since the copper concentration of a cobalt salt produced from the aqueous cobalt chloride solution can be reduced, it is possible to produce a cobalt salt suitable for a raw material for producing a material adversely affected by the presence of copper, like the material of the nonaqueous electrolyte secondary battery. In addition, as described above, when the generated aqueous solution is used as it is as the raw material of the positive electrode material, copper as an important impurity that greatly affects the performance of the battery can be removed to have a low concentration, so that the quality of the positive electrode material to be produced is improved.

Hereinafter, a case where copper is removed as an impurity from an aqueous cobalt chloride solution will be described as a representative example. Naturally, other impurities can be removed in the same way.

(Aqueous Cobalt Chloride Solution Refinement Method According to the Present Invention)

The aqueous cobalt chloride solution refinement method according to the present invention is a method for removing an impurity contained in an aqueous solution containing cobalt chloride (aqueous cobalt chloride solution) by a cementation reaction.

FIG. 1 shows a schematic flow diagram of the aqueous cobalt chloride solution refinement method according to the present invention. As shown in FIG. 1, in the aqueous cobalt chloride solution refinement method according to the present invention, metallic nickel is brought into contact with an aqueous cobalt chloride solution containing copper, which is a target aqueous solution, to remove copper by the cementation reaction. The chemical formula of this cementation reaction is shown in Formula 1. As can be seen from Formula 1, the metallic nickel is dissolved by the cementation reaction to become nickel ions, and copper ions are precipitated as metallic copper.

$$Ni+Cu^{2+} \rightarrow Ni^{2+}+Cu \qquad \text{(Formula 1)}$$

On the other hand, the metallic nickel usually has on its surface a passive film as an oxide, and the presence of this passive film inhibits dissolution of the metallic nickel. Thus, in the aqueous cobalt chloride solution refinement method according to the present invention, a washing treatment with acid is performed before the aqueous cobalt chloride solution is brought into contact with metallic nickel. Specifically, the washing treatment is performed with an acidic liquid having a pH of not more than 2.5. When such a washing treatment with acid is performed, the passive film formed on the surface of the metallic nickel is removed by the reaction shown in Formula 2, and nickel atoms are exposed on the surface of the metallic nickel.

$$NiO+2H^+ \rightarrow Ni+H_2O \qquad \text{(Formula 2)}$$

As described above, when the nickel atoms are exposed by removing the passive film, the above-described cementation reaction can be easily caused by bringing the aqueous cobalt chloride solution into contact with the metallic nickel. In other words, since copper can be precipitated instead of dissolving nickel in the aqueous cobalt chloride solution, the copper concentration (copper ion concentration) in the aqueous cobalt chloride solution can be reduced.

(Regarding Temperature of Aqueous Cobalt Chloride Solution)

In the aqueous cobalt chloride solution refinement method according to the present invention, the removal of the passive film and the cementation reaction are carried out in separate processes. For this reason, the temperature of the aqueous cobalt chloride solution during the cementation reaction can be lowered as compared with the case where the removal of the passive film and the cementation reaction are performed simultaneously.

When the removal of the passive film and the cementation reaction are to be performed simultaneously, the temperature of the aqueous solution needs to be maintained at not less than 60° C. in order to cause a reaction between the aqueous solution and the passive film.

However, in the aqueous cobalt chloride solution refinement method according to the present invention, the passive film is removed before the metallic nickel and the aqueous cobalt chloride solution are brought into contact with each other (before the cementation reaction is caused). Thus, it is possible to maintain the temperature of the aqueous cobalt chloride solution at approximately the temperature at which the cementation reaction is caused. That is, copper can be precipitated and removed by the cementation reaction while maintaining the aqueous cobalt chloride solution at room temperature (approximately 10 to 30° C.). Thus, since there is no need to warm the aqueous cobalt chloride solution, equipment for warming is unnecessary, and this is advantageous in that there is no need to increase the cost of equipment investment. Moreover, since the aqueous cobalt chloride solution is at room temperature, even if the liquid temperature of the aqueous cobalt chloride solution is increased by the cementation reaction, the liquid temperature does not become excessively high (not less than 60° C. which requires heat-resistant equipment), so that stable operation can be carried out.

Naturally, in order to accelerate the cementation reaction, the aqueous cobalt chloride solution may be warmed; however in this case, it is desirable to warm the aqueous cobalt chloride solution to have a liquid temperature of approximately 30 to 40° C. At such a temperature, even if the cementation reaction is caused, it can be prevented that the liquid temperature of the aqueous cobalt chloride solution becomes excessively high (not less than 60° C. which requires heat-resistant equipment).

(Regarding Metallic Nickel)

The metallic nickel to be brought into contact with the aqueous cobalt chloride solution may have any shape. For example, metallic nickel in the form of a plate, powder, crushed briquettes, or the like can be used. Particularly, in order to increase the efficiency of the cementation reaction, powders having a large specific surface area or crushed briquettes are preferable.

(Regarding Contact of Aqueous Cobalt Chloride Solution and Metallic Nickel)

The method for bringing the aqueous cobalt chloride solution and the metallic nickel into contact with each other is not particularly limited, and it may be sufficient that they come in contact with each other to such an extent that the cementation reaction is caused at an interface where they are in contact with each other. For example, the metallic nickel may be immersed in the aqueous cobalt chloride solution, or the aqueous cobalt chloride solution may pass through the metallic nickel (when the metallic nickel is in the form of a powder or crushed briquettes). Further, the aqueous cobalt chloride solution may be flown along a surface of the metallic nickel (when the metallic nickel is in the form of a plate). In order to efficiently cause the cementation reaction, it is desirable to immerse the metallic nickel in the aqueous cobalt chloride solution.

(Regarding Acidic Liquid)

The acidic liquid is not particularly limited as long as it can remove a passive film of the metallic nickel. For example, an acidic liquid such as hydrochloric acid, sulfuric acid, or nitric acid can be used. In the case where the cementation reaction is caused by supplying the metallic nickel together with the acidic liquid to the aqueous cobalt chloride solution, the acidic liquid is preferably hydrochloric acid.

The pH of the acidic liquid is not particularly limited as long as it can remove a passive film of the metallic nickel. For example, when the acidic liquid is hydrochloric acid or sulfuric acid, the passive film of the metallic nickel can be removed when the pH is not more than 2.5.

If the pH is too low, the metallic nickel under the passive film is dissolved, so that metallic nickel contributing to the cementation decreases, and the efficiency is deteriorated. In addition, since the amount of hydrogen generated per unit time increases, a safety device is additionally required, and the facility cost increases. Accordingly, the pH of the acidic liquid is adjusted to preferably not less than 1.5 and not more than 2.5, more preferably not less than 1.7 and not more than 2.3.

(pH of Aqueous Cobalt Chloride Solution)

The pH of the aqueous cobalt chloride solution is not particularly limited as long as the cementation reaction is caused. For example, if the pH is too low, the metallic nickel is dissolved regardless of the cementation reaction. Thus, metallic nickel contributing to the cementation decreases, and the efficiency is deteriorated. In addition, since the amount of hydrogen generated per unit time increases, a safety device is additionally required, and the facility cost increases.

Accordingly, the pH of the aqueous cobalt chloride solution is adjusted to preferably not less than 1.5 and not more than 2.5, more preferably not less than 1.7 and not more than 2.3.

EXAMPLES

The effect of removing an impurity by the aqueous cobalt chloride solution refinement method according to the present invention was confirmed.

In the experiments, it was confirmed how the copper concentration in an aqueous cobalt chloride solution changes by immersing metallic nickel in the aqueous cobalt chloride solution.

In the experiments, an aqueous cobalt chloride solution was used in which the pH was adjusted to 2.0 by adding an aqueous sodium hydroxide solution having a concentration of 2 mol/L to 400 mL of an aqueous cobalt chloride solution having a pH of 0.3, a copper concentration of 45 mg/L, and a cobalt concentration of 67 g/L.

As the metallic nickel, 40 g of crushed nickel briquettes was used.

Example 1

Forty grams of crushed nickel briquettes was immersed in 40 ml of 3 mol/L hydrochloric acid for 5 minutes, and was subjected to a washing treatment with acid (pickling treatment).

The crushed nickel briquettes were added to an aqueous cobalt chloride solution at room temperature (20° C.) to be stirred and mixed for 8 hours.

Comparative Example 1

Forty grams of crushed nickel briquettes not subjected to pickling treatment was added to an aqueous cobalt chloride solution at room temperature (20° C.) to be stirred and mixed for 7 hours.

Comparative Example 2

Forty grams of crushed nickel briquettes not subjected to pickling treatment was added to an aqueous cobalt chloride solution whose temperature was raised to 80° C. in a water bath to be stirred and mixed for 3 hours.

During stirring and mixing in each of the experiments of Example 1 to Comparative Example 2, the supernatant was sampled every one hour, and the copper concentration in the aqueous cobalt chloride solution was confirmed using ICP emission spectrometry (measuring apparatus manufactured by Seiko Instruments Inc., Model No. SPS 3000).

The results are shown in FIG. 2.

As shown in FIG. 2, in Comparative Example 1 in which the crushed nickel briquettes were not subjected to pickling treatment and is caused to react at room temperature (20° C.), 3 to 4 hours were required for reduction of the copper concentration to approximately 3 mg/L.

On the other hand, in Comparative Example 2 in which the cementation reaction was carried out at 80° C. without subjecting the crushed nickel briquettes to pickling treatment, the copper concentration could be reduced to approximately 3 mg/L for 1 hour.

In Example 1, despite the reaction was carried out at room temperature (20° C.), the copper concentration could be reduced to approximately 3 mg/L in the same time (1 hour) as in Comparative Example 2. That is, in Example 1, the same reaction rate as in the case of warming the aqueous cobalt chloride solution was obtained, and it was confirmed that sufficient copper removing effect could be obtained without warming.

From the above results, it was confirmed that by introducing the pickling process as a preliminary process of the cementation process, it was possible to shorten the time (reaction time) for removing copper from the aqueous cobalt chloride solution even if the reaction temperature was lowered.

INDUSTRIAL APPLICABILITY

The aqueous cobalt chloride solution refinement method according to the present invention is suitable for a method for removing an impurity from an aqueous cobalt chloride solution used as a raw material for a nonaqueous electrolyte secondary battery.

FIG. 1
1. Aqueous cobalt chloride solution
2. Cementation
3. Generated aqueous solution
4. Pickling
5. Acid solution
6. Metallic nickel
7. Solid matter FIG. 2
1. Copper concentration
2. Elapsed time
3. Example 1
4. Comparative Example 1

The invention claimed is:
1. A method comprising
   providing an aqueous solution containing cobalt chloride having a pH of not less than 1.5 and not more than 2.5,
   washing metallic nickel with an acidic liquid having a pH of not more than 2.5: and then
   bringing the metallic nickel into contact with the aqueous solution containing cobalt chloride to remove an impurity therein by a cementation reaction to yield a refined aqueous cobalt chloride solution.
2. The method according to claim 1, wherein in the step of bringing the metallic nickel into contact with the aqueous solution containing cobalt chloride, the aqueous solution containing cobalt chloride is at room temperature.
3. The method according to claim 1, wherein the impurity is copper.
4. The method according to claim 1, further comprising:
   using the refined aqueous cobalt chloride solution as a raw material in the preparation of a positive electrode material containing nickel and cobalt, for use in a nonaqueous electrolyte secondary battery.
5. The method according to claim 4, wherein
   in the step of bringing the metallic nickel into contact with the aqueous solution containing cobalt chloride, the aqueous solution containing cobalt chloride was produced as a process liquid in a nickel smelting process.
6. The method according to claim 1, wherein in the step of bringing the metallic nickel into contact with the aqueous solution containing cobalt chloride, the aqueous solution containing cobalt chloride is at a temperature of 10 to 40° C.

* * * * *